L. & W. GOETTSCH.
SEED CORN HOLDER.
APPLICATION FILED DEC. 26, 1916.
1,248,846.
Patented Dec. 4, 1917.
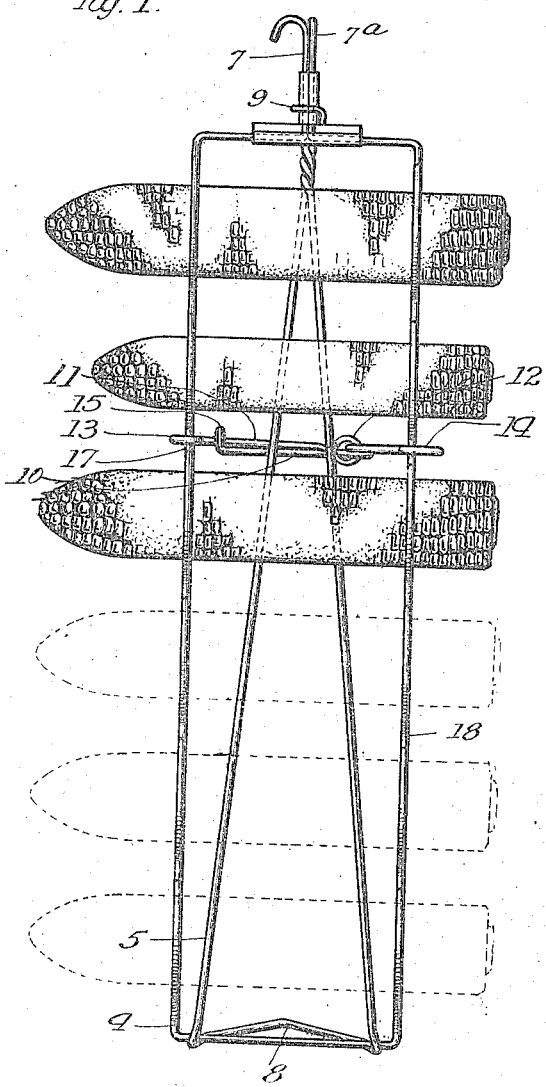
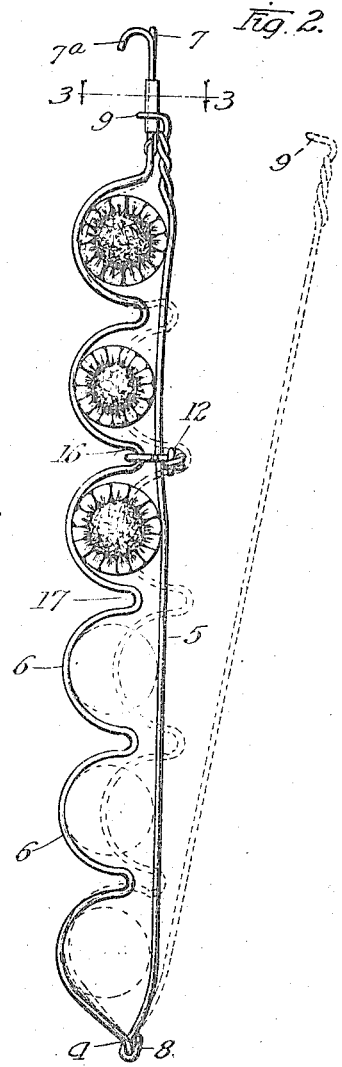
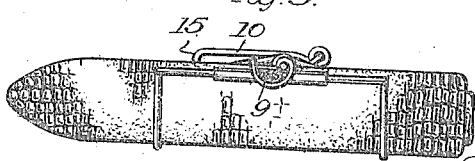
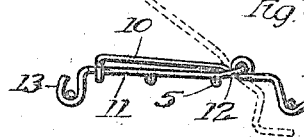
Witnesses:
Robert H. Weir
Arthur W. Carboy
Louis Goettsch
William Goettsch
Inventor
By Charles C. Bulkley
Attys.

UNITED STATES PATENT OFFICE.

LOUIS GOETTSCH, OF DAVENPORT, AND WILLIAM GOETTSCH, OF DONAHUE, IOWA.

SEED-CORN HOLDER.

1,248,846. Specification of Letters Patent. Patented Dec. 4, 1917.

Application filed December 26, 1916. Serial No. 138,772.

*To all whom it may concern:*

Be it known that we, LOUIS GOETTSCH and WILLIAM GOETTSCH, citizens of the United States of America, and residents of Davenport and Donahue, Iowa, respectively, have invented a certain new and useful Improvement in Seed-Corn Holders, of which the following is a specification.

Our invention relates to improvements in seed corn holders—that is, to a device for holding seed corn for drying and storage purposes.

One of the objects of our invention is to provide a seed corn holder which is very simple and inexpensive to manufacture, and one in which the ears of corn are held tightly in place so that there is no danger of the same dropping out when the holder is moved from place to place, or is agitated by the wind or other force.

Further features of our invention relate to having the seed corn holder so constructed that the ears of corn may be easily placed in same and then locked and held in the holder, and likewise the device is of such a character that the ears of corn may be readily removed from the holder when desired.

Further objects of our invention consist in having the corn so held in the holder that each ear is separately held in such a manner that the air is free to circulate around each ear and thus the drying proceeds much more effectively and rapidly.

Further objects of our invention consists in having the holder very portable; that is, it consists of comparatively small units which can be hung at any convenient place and it is capable of unlimited expansion by merely adding additional units which may be hung one upon the other.

These and other objects of our invention will be more readily understood by having reference to the accompanying drawings in which we have illustrated one embodiment of our invention.

In the drawings:

Figure 1 is a plan view of a device embodying our invention.

Fig. 2 is a side elevation of the same.

Fig. 3 is an end sectional view taken on the line 3—3 of Fig. 2.

Fig. 4 is a detail view of the locking member.

As illustrated, our device consists essentially of two members 4 and 5, made preferably of spring wire. The body member 4 is preferably rectangular in form and the sides of the same are provided with a plurality of semi-circular depressions 6 of a size suitable to receive the various ears of corn to be dried. Attached to one end of this rectangular member 4 are a pair of supporting hooks 7—7ᵃ which may be secured to the end wire of this member 4 in any suitable manner, and are arranged at right angles to each other. The holding member 5 is preferably triangular in form and at its base curves downward slightly, as shown in Fig. 2, and then curves around beneath the end wire of the member 4, the central portion 8 of the base of this triangular member being bent upward and partially around the end wire of the member 4 so that this triangular member 5 is pivotally mounted upon the member 4. At the apex of the triangular member 5, the two side wires are twisted together, and one of the same is formed into a laterally extending hook 9 which is adapted to engage with the shank of the hooks 7—7ᵃ to lock the two members 4 and 5 together, as clearly shown in Fig. 2.

In order to fill the holder, the hook 9 is first disengaged from the body member 4, and the member 5 then swung upwardly away from the member 4. The ears of corn are then placed in the various semi-circular depressions or pockets formed in the body member 4, and the holding member 5 then swung downwardly so that the hook 9 may be latched over the shanks of the hooks 7 to lock the two members together, thus holding the ears of corn in place in the various pockets. It will be noticed that normally the side wires of the body members 4 are slightly bowed, as shown in dotted lines in Fig. 2, thus forming a yielding and springlike support for the ears of corn when the member 5 is forced into locking engagement with the body member 4.

In order to more securely hold the intermediate ears of corn in place, and to enable these various ears of corn to be held firmly, even though of varying sizes, we provide an intermediate locking or holding member consisting of two members of spring wire 10—11. The member 10 is provided with an intermediate loop in which one end of the member 11 is fastened by means of an end loop 12. The opposite end of the member 11 is provided with a hook 13, while the two ends of the member 10 are provided with hook portions 14—15.

When the two members 4—5 have been locked in place, as heretofore described, the hook 14 of the member 10 is hooked beneath one of the intermediate loops 16 formed in the side members 4 between two adjacent semi-circular pockets, and the hook 13 of the member 11 is looped beneath an opposite loop 17. The free end of the member 10 is then swung downwardly over the two side members of the triangular holding member 5 and pressed downward on the same until the opposite hook 15 is hooked beneath the member 11. This member 5 being made of spring wire, is of sufficient resiliency so that this pressure of the locking member 10 presses this spring wire 5 against the intermediate ears of corn and holds them in place, even though these ears are of varying sizes.

When the holder has been loaded in this manner, it can then be hung in an upright position by means of either one of the hooks 7—7ª, and then another similar holder can be hung from the lower wire of the member 4 and thus a whole string of these holders can be supported from a single hook.

When it is desired to unload the device, it is merely necessary to disconnect the locking member 10 and then disengage the hook 9 from the member 4, at which time the holding member 5 can be swung upwardly and the ears of corn easily removed.

It will be seen from this construction that the device can be very easily loaded and unloaded and can be readily supported in various positions, and furthermore that the corn is held so that each ear is separated from the adjacent ear by a suitable air space so that there is a free circulation of air on all sides of each ear of corn, thereby facilitating the drying operation. Furthermore, by having the device constructed of spring wire, as described, there is sufficient resiliency to enable ears of varying sizes to be firmly and securely held by the device thereby eliminating the danger of their dropping out when the device is moved from one place to another, or is agitated from any other cause.

While we have illustrated one particular embodiment of our invention, it will, of course be understood that various changes and modifications will readily suggest themselves to those using the device without departing from the scope of our invention.

What we claim as our invention is:

1. In a seed corn holder, a body member provided with alined depressions for the reception of ears of corn, a second holding member pivotally mounted on said first member and adapted to be brought down into engagement with the corn in the holder, and means for locking said second member to said first member in said holding position.

2. In a seed corn holder, a rectangular body member provided with alined semi-circular depressions for the reception of ears of corn, a second holding member pivotally mounted on one end of said body member and adapted to be swung into engagement with the ears of corn carried by said body member and provided with a hook adapted to engage with the opposite end of said body member for locking the two members together.

3. In a seed corn holder, a body member formed of spring wire, and provided with alined depressions for the reception of ears of corn, a second holding member of spring wire pivotally mounted on said body member, and provided with means for locking said holding member in position to hold the ears of corn in the depressions in said body member.

4. In a seed corn holder, a rectangular body member formed of spring wire, provided with alined semi-circular depressions for the reception of ears of corn, a second holding member formed of spring wire pivotally mounted on one end of said body member and adapted to be swung into engagement with the ears of corn carried by said body member and provided with a hook adapted to engage with the opposite end of said body member for locking the two members together.

5. In a seed corn holder, a body member formed of spring wire, and provided with alined depressions for the reception of ears of corn, a second holding member of spring wire pivotally mounted on said body member, provided with means for locking said holding member in position to hold the ears of corn in the depressions in said body member, and means intermediate the ends of said holding member for forcing said member into engagement with the ears of corn.

6. In a seed corn holder, a rectangular body member formed of spring wire provided with alined semi-circular depressions for the reception of ears of corn, a second holding member formed of spring wire pivotally mounted on one end of said body member and adapted to be swung into engagement with the ears of corn carried by said body member and provided with a hook adapted to engage with the opposite end of said body member for locking the two members together, and means intermediate the ends of said holding member for forcing said member into engagement with the ears of corn.

7. In a seed corn holder, a rectangular body member formed of spring wire and provided with a plurality of depressions for the reception of ears of corn, a triangular holding member of spring wire pivotally mounted at its base to one end of said body member and provided with a hook at its apex for engagement with the opposite end of said body member, whereby said holding member is locked in position for holding said ears of corn within said body member.

8. In a seed corn holder, a rectangular body member formed of spring wire and provided with a plurality of depressions for the reception of ears of corn, a triangular holding member of spring wire pivotally mounted at its base to one end of said body member and provided with a hook at its apex for engagement with the opposite end of said body member, whereby said holding member is locked in position for holding said ears of corn within said body member, and means intermediate the ends of said holding number for forcing said member into engagement with the ears of corn.

Signed by us at Davenport, Scott county, Iowa, this 21st day of December, 1916.

LOUIS GOETTSCH.
WILLIAM GOETTSCH.

Copies of this patent may be obtained for five cents each, by addressing the "Commissioner of Patents, Washington, D. C."